United States Patent [19]

Demichelis et al.

[11] Patent Number: 4,995,032
[45] Date of Patent: Feb. 19, 1991

[54] LABEL-SWITCHING AND CONTROL INTERFACE FOR ASYNCHRONOUS FAST-PACKET SWITCHING

[75] Inventors: Carlo Demichelis; Paolo Mattone; Alessandro Zappalorto, all of Turin, Italy

[73] Assignee: Cselt - Centro Studi e Laboratori Telecomunicazioni SpA, Turin, Italy

[21] Appl. No.: 397,123

[22] Filed: Aug. 22, 1989

[30] Foreign Application Priority Data

Oct. 17, 1988 [IT] Italy ................................ 67924 A/88

[51] Int. Cl.$^5$ ................................................ H04J 3/28
[52] U.S. Cl. ..................................... 370/60; 370/85.11
[58] Field of Search ...................... 370/60, 94.1, 58.1, 370/85.1

[56] References Cited

U.S. PATENT DOCUMENTS

| | | | |
|---|---|---|---|
| 4,592,048 | 5/1986 | Bechner et al. | 370/60 |
| 4,596,010 | 6/1986 | Bechner et al. | 370/60 |
| 4,631,534 | 12/1986 | Franklin et al. | 370/60 |
| 4,644,533 | 2/1987 | Braff et al. | 370/60 |
| 4,799,215 | 1/1989 | Suzuki | 370/60 |

Primary Examiner—Douglas W. Olms
Assistant Examiner—Min Jung
Attorney, Agent, or Firm—Herbert Dubno

[57] ABSTRACT

A label-switching and control interface for asynchronous fast-packet switching consisting of a set of label-switching and cell-processing units controlled by a suitable control unit. The units operate at each multiplex level in real time thanks to a microprogrammed logic requiring the control processor intervention only at the connection set-up/release. The units implement the low levels of the flow control algorithms necessary to conveniently exploit the advantages of the techniques. The label becomes indicative of a virtual circuit which is allotted only locally to the call, annulling thus the necessity of very extensive labels, while the parameters which characterize the connection which uses a particular label are stored in the unit itself. Each unit switches the label characterizing the connection on the node input multiplex, with that whereby it is characterized on the output multiplex and at the same time associates, with each cell, the information necessary to multiplex switching which is then carried out in a self-routing network. The cells processed in this way by each unit of the set are statistically multiplexed in an asynchronous way and sent to a connection network termination. Such a termination serves a plurality of asynchronous multiplexes, which can be at a different frequency from each other and more particularly it is worth noting that each label-switching unit does not have its own operating frequency, but automatically takes up that of the asynchronous multiplex to which it is connected.

6 Claims, 6 Drawing Sheets

LABEL-SWITCHING AND CONTROL INTERFACE FOR ASYNCHRONOUS FAST-PACKET SWITCHING

FIELD OF THE INVENTION

The present invention relates to digital signal transmission systems and, more particularly, a label-switching and control interface for asynchronous fast-packet switching.

BACKGROUND OF THE INVENTION

As is well known from the scientific and technical literature, new asynchronous fast packet switching techniques, also referred to as label-addressed switching techniques, associated with corresponding multiplation and asynchronous transmission techniques, have numerous advantages over traditional synchronous digital switching and transmission techniques. The asynchronous transfer mode is in fact mostly independent of the type and rate of the service considered, and allows a dimensioning of switching apparatus and transmission means based on values near the traffic average to be served. The information generated by the subscriber is, if requested, coded in a digital format and then grouped into packets, whose length is generally predetermined and each packet is provided with a label indicating the call to which it belongs.

Unlike the operations in traditional packet switching, the call is not allotted on each segment a specific circuit or a particular time interval inside a frame, but packets relevant to various calls are forwarded, as they become available, on a single path of the asynchronous multiplex. On this path, which has its own bandwidth dependent on its clock frequency, each call forwards only the packets containing its useful data and then it occupies, at each instant, only the band it needs; this allows a very natural and efficient statistical multiplexing. The switching of a call by a calling subscriber to a called subscriber consists then, at each node, of the switching of a multiplex and of a label-switching on the multiplex.

Technological improvement of transmission means allows HDLC protocol checks to be avoided segment by segment and allows them to be limited to the two connection ends. This considerably improves the system performances, provided switching operation in each node is carried out so as not to introduce in turn excessive delays.

According to presently accepted terminology, the particular packet used in these systems is referred to as a "cell".

The state of the present art on application of these, comprises a number of experimental implementations wherein some renounce label switching, using on all the connection trunks always the same label, i.e. considering the latter as the virtual call indicative on each trunk involved by the call; however, gives rise to label allotting problems, more particularly on networks whose nodes are connected by complex meshes, and requires very large labels, containing parameters for identifying the calling and the called party, and which in turn require long cells to avoid excessive netband losses. There are two disadvantages: long labels are less easy to handle since their hardware processing becomes much complex, while software processing generates an inacceptable time loss; besides long cells degrade the performances of many self-routing switching networks, which are the types of networks which are better suited to asynchronous switching.

In other embodiments label switching is carried out by a centralized processor on the basis of each cell, for each of the multiplexes arriving at the switching node, and this dramatically limits the rates of multiplexes connected or the number of contemporary virtual calls which can be managed; besides multiplexes must be homogeneous, i.e. all must have the same band, and each of them is connected to an input of the connection network. This considerably reduces system flexibility not only as regards its gradual growth, but also a correct and efficient multiplex utilization; in fact, owing to the great band difference the calls can require, if a multiplex is dimensioned so as to allow a reasonable statistical occupancy with wide-band calls, its size will become excessive for narrow band calls, since its occupancy by a reasonable traffic percentage would imply a number of calls difficult to manage, while a sufficient mixing of different-band calls is not always possible or convenient.

In present systems, connections from one point to a plurality of points either are not set-up, or they require special duplicating networks, which can double the size of the connection network, even though such type of traffic is envisaged to be low with respect to total traffic, or even if they require routing towards special-purpose multipoint switching apparatus.

In present implementations the degree of modularity is rather low and each multiplex is connected to a termination of the connection network, which receives only this multiplex. The addition of a new multiplex implies then an enlargement of the connection network, which can be properly exploited only if the multiplex is operable at a high rate; in other words traffic concentration at the switching network input does not exist.

SUMMARY OF THE INVENTION

These disadvantages are overcome by the label-switching and control interface for asynchronous fast packet switching, provided by the present invention, which comprises a set of label-switching and cell-processing units controlled by a suitable control unit. The units operate at each multiplex level in real time thanks to a microprogrammed logic requiring the control processor intervention only at the connection set-up/release. These control units implement the low levels of the flow control algorithms necessary to conveniently exploit the advantages of said techniques. The label becomes indicative of a virtual circuit which is allotted only locally to the call, annulling thus the need for very extensive labels, while the parameters characterizing the connection which uses a particular label are stored in the unit itself.

Each unit switches the label characterizing the connection on the node input multiplex, with that by which it is characterized on the output multiplex and associates at the same time, with each cell, the information necessary to switch multiplex switching which is then carried out in a self-routing network. The cells processed in this way by each unit of the set are statistically multiplexed in an asynchronous way and sent to a connection network termination. Such a termination serves a plurality of asynchronous multiplexes, which can be at different frequencies from each other. Each label and more particularly it is worth noticing that each label switching unit does not have its own operating frequency, but automatically takes up that of the asynchronous multiplex it is connected to. The possibility of having independent and different-frequency asynchronous multiplexes allows optimization of multiplex occupancy even with very different-band traffics, while the units also support dynamic variations in the multiplex band they are connected with. Through the same connection network and with cells of the same type as the data ones, processors controlling each control and label switching interface can communicate with the processors of every interface and hence it is possible, in a natural and efficient way, to implement a global control multiprocessor of the node based on the interface control processors.

Moreover, the switching system for multipoint connections need not be enlarged, since each unit has the possibility of duplicating the cells of each call many times, supplying each pair with suitable switching information, communicated to the unit itself at any call instant.

The number of cell processings units in a label-switching and control interface can change, and this gives a good system modularity. Also multiplex frequencies, as mentioned, can be different and easy to change, thus supplying a very simple way of reconfiguring the network. The only constraint is that the total flow of multiplexed cells at the connection network input, ought not to exceed its switching capacity on the average.

A label-switching and control interface for asynchronous fast packet-switching, wherein the packets, or cells, relevant to different calls are forwarded, as they become available, on bidirectional asynchronous multiplexes, comprises a plurality of said bidirectional asynchronous multiplexes connected to the same number of blocks carrying out fast cell processing and are connected to an input bus of a multiplex switching-network, under the control of an arbitrating circuit and of a first bus, and to an output bus of the same network through a distribution circuit, a second bus, and a common control circuit being connected through a third bus to each block, which accesses the switching network through a first connection and the same arbitrating circuit and, conversely, the network accesses the common control circuit through the same distributing circuit and a second connection.

BRIEF DESCRIPTION OF THE INVENTION

The foregoing and other characteristics of the present invention will be made clearer by the following description of a preferred embodiment of the same, reference being made to the annexed drawing, in which.

SPECIFIC DESCRIPTION

Figure 1:
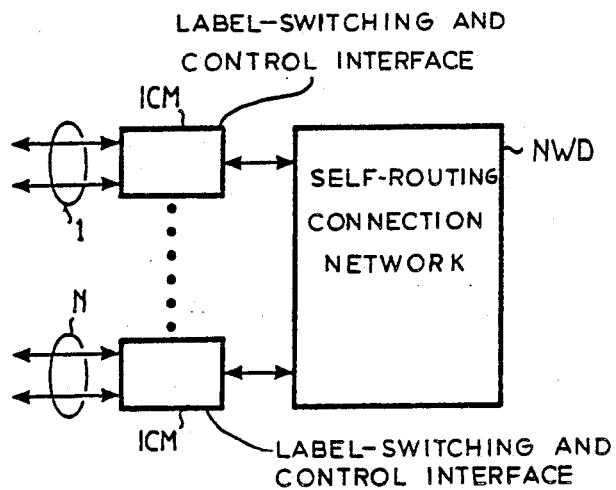
FIG. 1 is a block diagram which depicts an insertion scheme of a label-switching and control interface.

In the insertion scheme of FIG. 1, the label switching and control interface is denoted by ICM, while NWD denotes a self-routing connection network.

FIG. 1 shows a switching node connected with a number of asynchronous multiplexes, present on wires from 1 to N, each carrying a bidirectional flow of cells having a fixed length. Each cell is equipped with a label indicating on the multiplex a virtual circuit, which locally, can be allotted to a virtual call. Cells with a particular label are present on the multiplex only when, for the relative call, there are data useful to transmit. Hence virtual circuits nonallotted to any call do not emit cells, leaving the transmission band available to the others. The intervals, in which no seized circuit has data to be transmitted are stuffed with blank cells, allotted to a particular virtual circuit called the stuffing circuit. Periodically, for every M cells emitted, a cell is emitted whose label allots it to a virtual supervisory circuit. In the same way one or more labels are assigned to the same number of signalling flows (virtual signalling circuits).

It is no constraint that some asynchronous multiplexes can be in turn channels of a synchronous multiplex, since at the input such channels are demultiplexed into asynchronous multiplex components and vice versa at the output. On each asynchronous multiplex the transmissive means keeps and returns the bit and octet clock information, while channels in the classical meaning of the digital transmission are not detectable.

By way of example a cell format is described which can be used in the system. Any desired format can be used, provided it contains the same types of fields and comprises a fixed and integer number of octets.

The cell is formed of 32 octets, the first two of which form the header and the remaining 30 the information contents carried. The header is in turn split into two parts of which the first, made up of 13 bits, is the cell label, while the second made up of 3 bits, is a label protecting code which, as will be described hereinafter, is used also for delimiting the cell. 8192 virtual circuits can thus be detected on each asynchronous multiplex.

The asynchronous multiplex is formed by an interrupted sequence of said cells implemented with the modalities above; the transceiving system supplies the bit clock, the octet synchronism and masking criterion to indicate possible octets which do not make part of the flow carried by the multiplex, but belong to service flows used by the transmission system according to well-known transmission techniques.

The invention uses a number (up to 7) of these bidirectional multiplexes and a cell self-routing connection network, i.e. a connection network capable of carrying data cells from an input to an output according to the code contained in the respective cell. Each termination of the interface ICM. Examples of such networks are already known to those skilled in the art, such as for instance the family of Delta networks.

Figure 2:
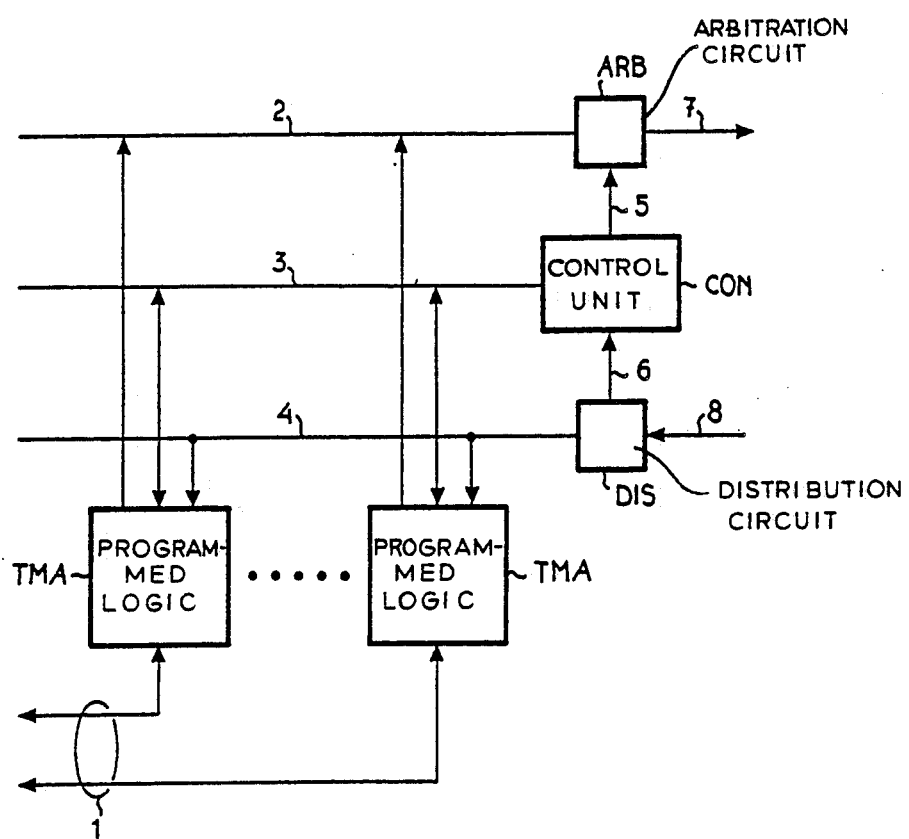
FIG. 2 is a block diagram of the internal interface structure.

FIG. 2 depicts the internal structure of the interface provided by the invention.

Each asynchronous bidirectional multiplex, present on the wires of connection 1, is connected to a block denoted in the figure by TMA, which is the microprogrammed logic for fast cell processing. Up to 7 of these blocks can be present in the interface. They are connected to input bus 2 of the multiplex switching network, through an arbitration circuit ARB and bus 7, to bus 8 outgoing from the same network, through a distributing circuit DIS and bus 4. A common control block CON is connected to each block TMA of the interface through bus 3; the same block accesses the connection network through connection 5 and the same arbiter ARB and, conversely, the network accesses control CON through the same distributor DIS and connection 6. All information sent through the connection network, no matter of what type, is organized into cells of the described format.

Each block TMA carries out the following functions on the flow of cells coming to the input side on connection 1:
- rejection of the masked octets, which do not belong to the flow;
- detection of cell position in the flow;
- control of label redundancies;
- rejection of the cells with noncorrect label;
- separation of data flow from signalling flow and from supervision flow;
- elimination of stuffing cells;
- forwarding of supervisory cells to control block;
- label switching for data cells;
- storage of data cells for multipoint connections which are separated at the node;
- forwarding to multiplex switching network (selfrouting) of data cells with switching code;
- forwarding to the switching network of the copies of cells for multipoint connection, each with its switched label and its code for routing in the switching network; and
- management of the first level of flow control algorithms.

Since up to 7 asynchronous multiplexes are connected with each network termination, the block allots also to a cell forwarded towards the connection network the code of a destination multiplex, among those connected to the addressed network termination. A simple, yet not binding way of inserting this code into the cell is that of using the bits, which on the line multiplex were the label redundancy.

The flow of the cells outgoing onto the multiplex connected to block TMA, connection 1, outgoing side, comprises data cells emerging from the connection network termination, which cells are denoted by the multiplex code relevant to block TMA taken into account, signalling cells emitted towards the same multiplex by control block, supervisory cells emitted by the block TMA itself and finally, when the above-type cells are not available for transmission, stuffing cells still emitted by the same block TMA.

The functions of block TMA on the outgoing flow are the following:
- arbitration among the various cell sources;
- insertion of supervisory cells at predetermined time periods;
- insertion of stuffing cells whenever required to keep flow continuity; and
- computation and insertion of redundancies on outgoing cell labels;
- temporary storage of cells coming from the network for adaptation of two different synchronism types between the switching network and the multiplex.

Control block CON is based on any fast processor of known type whereto a particular interface is added allowing it to emit data towards the connection network and receive data therefrom, under format of cells of the same type as those used for subscriber data and signalling by the processor. Data emitted can be meant for the processor of another similar interface connected to another network termination, or to an outgoing multiplex, both as subscriber data and signalling. The data of said types which are to be sent on multiplexes connected to the interface itself are instead transferred to the relevant block TMA through a bus extension and bus 3. Through the same extension the control block accesses a common memory bank present in each termination.

Figure 3:
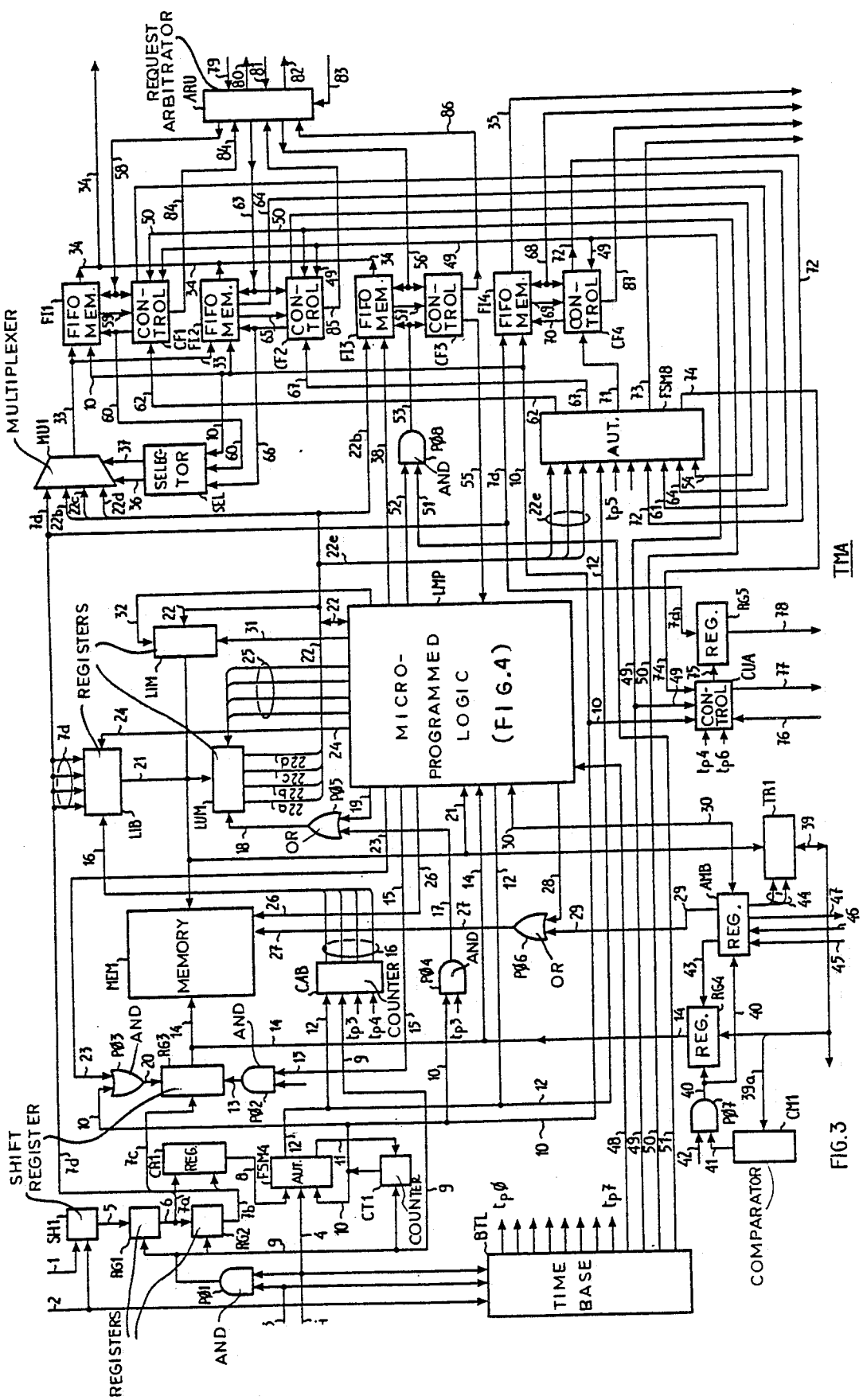
FIG. 3 is a diagram of the input section of the block denoted by TMA in FIG. 2.

We will now describe the input side of block TMA, represented in FIG. 3.

Wire 1 carries the asynchronous serial multiplex as described above and comes from a common and well known "modem", which also supplies the bit clock on wire 2 and the octet clock on wire 3, while wire 4 carries the possible mask criterion for possible octets not belonging to the asynchronous multiplex data flow. Signals on wires 2,3,4 are used by a line time-base circuit BTL, which by the well-known techniques, obtains a series of 8 cyclic pulses, each corresponding to a time bit in the received octet, and a train of four cyclical pulses at the frequency of the received octet. Said signals are available on wires denoted respectively with tp0-tp7 and 48,49,50,51.

The bit flow is loaded by the bit clock (wire 2) on an 8-bit shift register SH1, whose contents is transferred by the octet flow (wire 3, gate P01, wire 9) in parallel on wires 5 to a register RG1, whenever the mask criterion is not present on wire 4, i.e. each time the octet is useful. The octet clock itself carries the contents of register RG1 to a register RG2 through wires 6. The 16 bits contained in the two registers are hence at each instant, two following octets of the entering flow, which are sent, through wires 7a,7b, to the input of a parallel redundancy controller CR1, whose output 8 assumes the high or low logic state in function of coherence or lack of coherence of the three bits considered as redundancies in comparison with the others: which condition is to occur when the two octets are the header of a cell (label and reduncancies). In this case, e.g., the control resides in the check of three parity bits, computed on three different sets of the bits contained in registers RG1, RG2. The masked octet clock (wire 9) advances a counter CT1, whose counting module is equal to the octet number each cell is made of. The end-of-count signal supplied by CT1 on wire 10 is sent, together with wire 8, to a finite state automaton (well known in the art) FSM4 which is capable of assuming 4 states. Automaton FSM4 considers at the input also mask wire 4, which indicates when the input condition is significant.

State 0, wherefrom FSM4 starts after system initialization, is the the state wherein the cell location in the incoming flow is unknown. Under this state the first signal on wire 8 indicating coherent redundancies is intended as a label detection, FSM4 sends, onto wire 11, a reset signal to counter CT1 and passes to state 1.

State 1 is that of temporary locking, since the 16 bits causing said state might have been label simulating data. Under this state FSM4 waits for the end-of-count signal on wire 10, and, at the instant at which it receives this signal, checks on wire 8 the presence of a signal indicating a new coherence (and hence a new label). In the affirmative it passes to state 2, in the negative it returns to state 0.

State 2 is a normal functioning state: at each end-of-count signal received from wire 10, FSM4 checks the presence of a correct signal on wire 8; if it finds it remains in state 2 and emits forwards, on wire 12, the information of label present on registers RG1,RG2. Whenever wire 9 does not signal correct redundancies, FSM4 passes to state 3.

State 3 is the state wherein FSM4 decides whether there was an error on the label or there is a locking loss. To identify either condition it waits on wire 10 for the end-of-count signal to check again wire 8. If the check is positive, it returns to state 2, otherwise it passes to state 0 and begin again the search.

Figure 4:
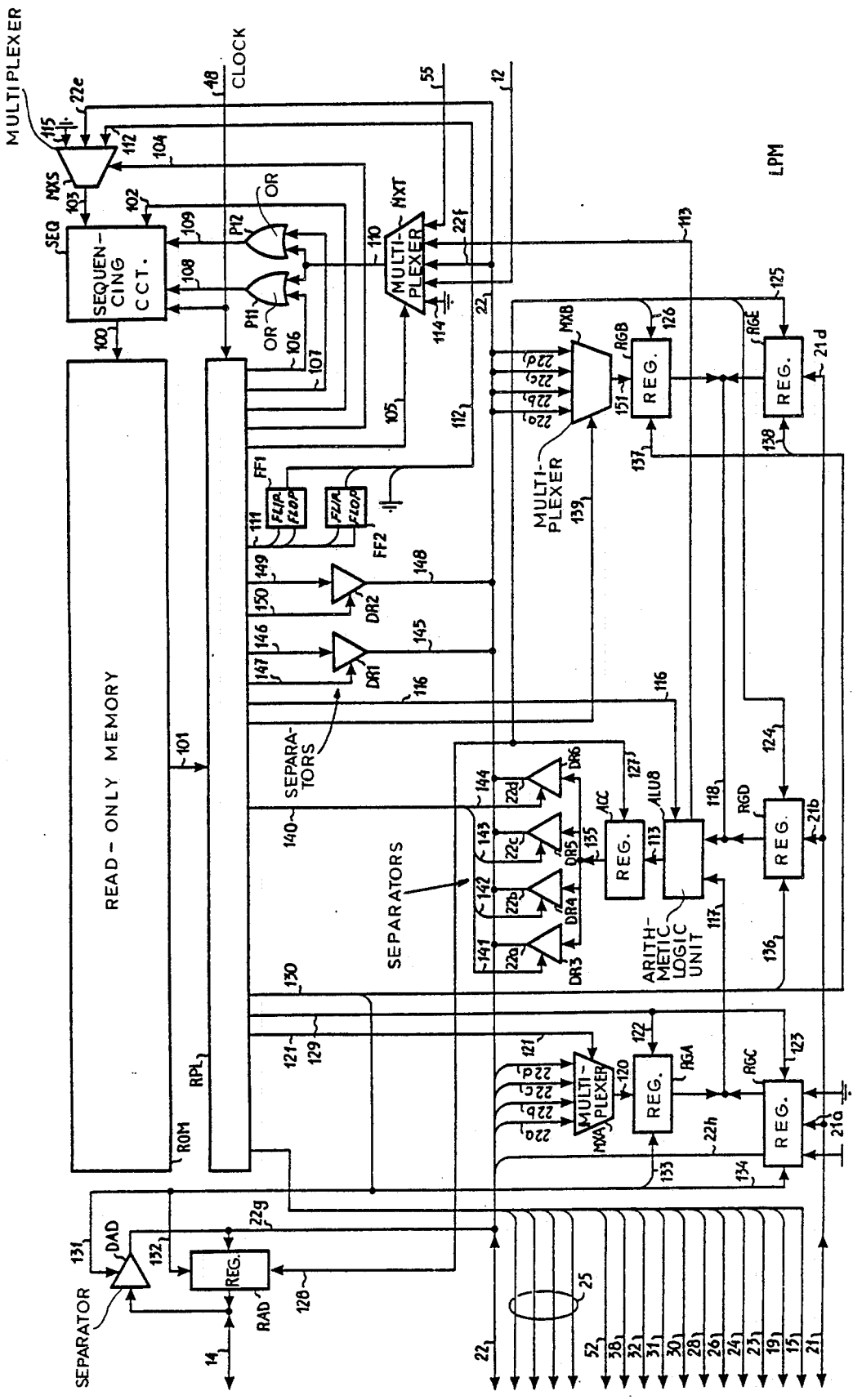
FIG. 4 is a diagram of the microprogrammed logic denoted by LMP in FIG. 3.

On the above-described wire 12 there is hence a signal whenever on registers RG1,RG2 there is the label of a cell coming from the asynchronous multiplex 1 and FSM4 is at state 2. Connection 7c collects from wires 7a and 7b 13 wires corresponding to bits forming the cell label and carries them to the first 13 inputs of a 14-bit register RG3, the last being kept at a logic "0". The load of that register takes place, at the arriving octet rhythm directly under the control of time base BTL with signal tp1, through gate P02 and wire 13. Gate P02 allows inhibiting such a load by a microprogrammed logic LMP which is depicted in FIG. 4 and will be described hereinafter, through wire 15. The signal above, present on wire 12, communicates that RG3 contents corresponds to an arriving cell label. To this aim wire 12 is sent to logic LMP, where acts as will be seen hereinafter. The same wire 12 is also sent to a circuit CAB for loading a register LIB. Such a circuit is a simple divide-by-4 counter which is synchronized by wire 12 and generates in sequence 4 pulses on wires 16, which sequentially cause the load at the octet rhythm of the four 8-bit sections whereinto 32-bit register LIB is subdivided. The inputs of such sections are parallel-connected and form connection 7d which carries the 8 bits coming from RG2. The function of register LIB will be described as far as logic LMP is concerned, since it is comprised in its functions. A signal is present on previously-described wire 10 for the duration of reception of an octet, each time a label is expected on registers RG1 and RG2 (CT1 count end). As seen, register RG3 is automatically loaded and the said wire 10, through gate OR P03 and wire 20 enables its contents as an address to memory MEM, through bus 14. The addressed location contents comes to the inputs of a 32-bit register LUM, through a bus 21. Such register is loaded in a successive time slot by the same signal present on wire 10, through gate P04, wire 17, OR gate P05 and wire 18. AND gate P04 helps partialize the storage signal at a suitable time while OR gate P05 helps allow the storage of register LUM also by LMP, through wire 19.

As will be seen, logic LMP, synchronized by wire 12, keeps enabled at this instant the outputs of the four sections of register LUM through the four wires of connection 25 and the four octets contained are presented on bus 22. More particularly three bits of section 22a, which form connection 22e, are sent as inputs to a finite-state automaton FSM8, together with wire 12, indicating when the code is valid on connection 22e.

In the location of memory MEM, read in this way, the control processor had previously written, as will be written hereinafter, the information relevant to the connection whereto the label addressing the memory itself has been allotted. In 32-bit word loaded in this phase on register LUM the three bits corresponding to connection wires 22e can assume 8 values with the following meanings:

0 = The label used as an address corresponds to a stuffing cell, the other word bits are not meaningful and the cell itself is to be left out without any more operations.

1 = The cell associated with the label received is relevant to the data of a connection in progress with high priority, towards an only correspondent; on connection 22b (second octet of the read word) there is the selfrouting code for the cell in the connection network, while on the connections 22c and 22d (third and fourth octet of the read word) there is on 3 bits the code of the destination multiplex among those connected to output ICM and on the remaining 13 bits there is the label assigned to the connection on the outgoing trunk.

2 = As for the previous code 1, except that the connection is of the type at medium priority.

3 = As for the previous cases 1 and 2, except that the connection is of the type at low priority.

4 = The label received is relevant to the data cells of a multipoint connection which spreads starting from ICM. The cell proper is to be memorized and then repeated in a plurality of copies. In this case on wires 22b there is a code indicating the maximum number of cells of that connection which can be memorized waiting to be copied and emitted towards the switching network, on wires 22c there is the number of cells still in wait-state, while the wires 22d carry the number which has been locally assigned to the multipoint call (from 0 to 31) and the number of branches at the node (from 1 to 7).

5 = the label is relevant to signalling or supervisory cells which are to be sent to the control processor; the other three octets of the word are non-significant.

6 = Cell for diverted path, whereupon no operation is effected, to be sent octet by octet to the auxiliary output. The other octets of the word are non-significant.

7 = Label non allotted, error situation to be communicated to the processor.

Finite-state automaton FSM8 receives also as input wire 72, indicating whether the FIFO memory FI4 is capable of accepting a cell, wire 61 which is the analogous for FIFO memory FI1, wires 63 and 64 which, for shift memory FI2 denote respectively whether the occupancy exceeds half its capacity and whether FI2 can receive a cell again. Here are still two timing signals as inputs. Said state wires of FI1,FI2 and FI4 respectively arrive from wires 59,65,69 through control circuits CF1, CF2, CF4 which maintain with the usual techniques, the count of loaded/unloaded cells. Wire 64 arrives at FSM8 directly from FI2 (blocks FI1, FI2, FI3, FI4 are commercially-available integrated circuits).

On the wires outgoing from FSM8 there are control signals designed to transfer forward cells which directly go towards the connection network, towards the processor or towards the auxiliary diverted path. More particularly wire 62 is activated when FSM8 has received on connection 22e code number 1. In this case the cell is to be loaded in FI1 and wire 62 transmits to control CF1 the enabling to the load, if this is not signalling the state of stuffed FI1. Memory FI1 is organized into 512 words of 9 bits, 8 of which arrive from a 4-path multiplexer MU1, while the ninth is connected to end-of-count wire 10 of counter CT1.

The control circuit CF1 receives on wires 49 and 50 from time base BTL timings for loading FI1 and, through wire 60, gives load pulses to FI1; the same pulses are received, on the same wire, by a circuit SEL which selects the inputs of multiplexer MU1, with wires 36 and 37. The inputs of MU1 are sections 22b,22c,22d of bus 22 arriving from register LUM and section 7d of bus 7, arriving from register RG2, containing, as seen, the octets received. The self-routing code for the connection network, the two octets containing the three bits selecting the termination and the new label the cell will have on the outgoing asynchronous multiplex, and then the thirty data octets of the arriving cell are thus loaded in sequence in FIFO memory FI1. Wire 10 carrying the end-of-count signal of counter CT1 communicates the presence of the last octet of the cell on connection 7d to CF1, so that it can return to the initial state after the load. The same wire 10 is loaded as ninth bit in FI1 and in this way the last octet of the loaded cell is indicated.

If automaton FSM8 has received on connection 22e code number 2, it activates wire 67 towards control CF2, which is perfectly analogous to CF1 and receives the same time criteria on wires 49 and 50. Through wire 66 towards FI2 and SEL circuit CF2 effects the load of cells on memory FI2 exactly as seen above.

If, on the contrary, FSM8 has received code number 3 from connection 22e, it will activate wire 67 for loading the cell on FI2 only if wire 64, that comes from FI2 and that indicates that memory stuffing has exceeded half the available space, is not active. For the rest everything proceeds in the same way.

If the code on 22e is number 4, automaton FSM8 does not intervene, in fact, the cell is for a multipoint connection, managed by microprogrammed logic LMP, and the relevant actions will be described hereinafter with the description of the logic itself.

If the above code is on the contrary number 5 and the cell is to be forwarded to control processor, FSM8 activates wire 71 towards control circuit CF4, which differs from CF1 and CF2 in that 32 instead of 33 octets are to be loaded inside, since the self-routing code is not present. Besides all the octets arrive, in this case, from connection 7d. Circuit CF4 supplies FI4 with load pulses on wire 70, while from time base BTL it receives only timing 49, since wire 50 would supply the load instant of the self-routing code which in this case is absent.

When control circuits CF1, CF2 and CF4 do not authorize the load, FSM8 does not carry out its cycle and the cell is lost, but FSM8 emits on wire 369 a signal incrementing a counter which will be described hereinafter.

If the code received on connection 22e is number 6, finite-state automaton FSM8 just forwards the load-enable command on wire 74 towards a circuit CUA controlling the auxiliary output, without checking its availability. The latter circuit receives also timing circuit 49 and wire 10 which, as before, indicates the last octet.

Through wire 75 it loads in succession on register RG5 cell octets which one by one arrive on connection 7d, using tp4 and tp6 coming from time base BTL. Wires 77 and 76 are respectively data ready and data seized criteria, while connection 78 carries to the output the octets towards a possible external unit. If such a unit is absent the cell get lost on register RG5.

If, finally, the code on connection 22e is number 7 of alarm, wire 73 is simply activated towards the interface toward/from processor, which will be successively described, and towards the transmissive part.

The structure and the functioning of microprogrammed logic LMP, whose scheme is detailed in FIG. 4, is now depicted.

The functions of this logic are relevant to multipoint connection processing, and more particularly said logic manages the areas of memory MEM (FIG. 3) designed to contain the cells to be forwarded towards more than an addressee, it stores in this memory such cells and finally retransmits them towards the connection network by using data found in the memory in a suitable table of the correspondents, previously written by the control processor.

The microprogram is stored in a read-only memory denoted in the Figure by ROM, of a 256 82-bit word size, driven by a sequencing circuit SEQ of a commercially available type, through 8-wire connection 100. The microinstruction contained in ROM at the addressed cell is loaded onto register RPL by the clock of the microprogam which arrives directly from time base BTL of FIG. 3 on wire 48 and has a frequency equal to twice that of interarrival of the line octets; such a clock is used also for advancing sequencer SEQ. The sequencer comprises a one-bit-five-path multiplexer MXT for selecting bits under test, a three-bit-three-path multiplexer MXS, for selecting jump code, and two gates P11 and P12 for modifying the sequencing function on the bit test. Since such sequencing structure is known to the skilled in the art, it is not described; only connection meaning is disclosed. Wires 106, 107 are the wires selecting the source of the following address (sequencer AMD 2109 is considered as a non-limiting reference). Said wires arrive at OR gates P11 and P12, which receive also the values of bits under test on wires 110 from multiplexer MXT; the sequencing function proceeds towards sequencer SEQ on wires 108 and 109. Connection 105 transfers from register RPL to multiplexer to MXT the three bits which select which of the input wires of MXT is to be controlled. Among them wire 114 is fixed at low level and its selection corresponds to the state of no bit under test.

Connection 104 carries the two selecting wires for multiplexer MXS while connection 103 transfers the 3-wire output of multiplexer MXS to the OR input of sequencer SEQ. Such an input places directly the jump code in OR on three out of the eight SEQ output wires 100. Connection 102 transfers from register RPL to SEQ the eight wires for the direct addressing code.

Wire 12 (FIG. 3), which supplies the time locking criterium at each label arrival and indicates the beginning of an operation cycle; wire 22f, which is the most-significant bit on bus 22 (FIG. 3), the LMP logic internal-bus; wire 113, which arrives from a circuit ALU8, a logic and arithmetic 8-bit unit, and indicates the two operand equality at ALU8 input; wire 55 (FIG. 3), which indicates the state of FIFO memory FI3 whereto the logic transfers the copies of the cells for multipoint connections, are all connected as test bits to multiplexer MXT.

Multiplexer MXS has three inputs, one of which (connection 115) has all the wires at low level; its selection corresponds to the state of absence of jumps in the microprogram. The second input, connection 22e, is connected to three wires of section 22a of the internal bus, corresponding in a suitable phase, to the code relevant to the type of label received (as in FIG. 3); finally the third input (connection 112) collects on two wires the criterium of lack of memory areas for the loading of arriving cells and complete queue criterium of tasks in wait state (also contained in memory MEM); such criteria are retrieved from two bistables FF1 and FF2 respectively, in turn controlled by four wires of connection 111, arriving directly from RPL, while the third of jump code wire is kept at the lowest level.

The operating cycle duration of logic LMP is less than or equal to a cell arrival time on the input multiplex. This allows said cycle to be locked to this time, causing it to start upon reception of each label. To this end wire 12, carrying such a criterion, is carried as a bit under test to multiplexer MXT. Once the preceding cycle is over, the microprogram remains in waiting state for this criterion enabling the corresponding MXT input by the suitable code on connection 105. Afterwards, the code which characterizes the arriving cell is explored by a jump onto the code of connection 22e, arriving from bus 22.

In case of a multipoint cell, the cell storage cycle begins. The four wires 25 outgoing from register RPL are enablings on bus 22 of the four sections of register LUM and in this phase section 22a is enabled (and as a consequence wires 22e are active) and then MXS as well as automaton FSM8 of FIG. 3 receive the code of the type of arriving cell. The logic-arithmetic operations are executed by block ALU8, which receives the code of the operation to be executed by the microinstruction loaded on register RBL through the six wires of connection 116. The operands are present on 8-wire buses 117 and 118, and the result is placed on connection 119.

One of the two sources of bus 117 is 8-bit register RGA; through 8-wire connection 120 and multiplexer MXA, this register can receive any section of bus 22; to this aim the two wires of connection 121 from RPL select the desired input. The loading commands by registers present in LMP are grouped into 7-wire connection 129. One of the wires is wire 122 for loading RGA. The enable commands for the outputs of the registers themselves and of the group of three-state separators DAD which will be examined hereinafter, are grouped into 8-wire connection 130 coming from register RPL, one of the wires is wire 133 for enabling register RGA outputs. The other register, whose outputs are connected to bus 117 is register RGC.

The latter is a 14-bit register, of which only the eighth least significant bits are connected to bus 117, while the other 6, through connection 22h, are connected to bus 22 as the least significant bits of section 22c. Register RGC can be loaded through wire 123 and can be enabled through wire 134, coming from microinstruction register RPL. Register RGC input is organized as follows: the three most significant bits are a cabled code equal to three most significant bits among the addresses of the memory MEM space (FIG. 3) containing switching data tables relevant to corresponding subscribers of each multipoint call in progress, the three least significant bits are cabled at low-level, while the remaining eight bits are the most significant bits of bus 21 (FIG. 3) of memory MEM input and output, this octet is denoted as section 21a.

Bus 118 connected to the input of the ALU8 second-operand has three registers as sources:

8-bit register RGB, which can be loaded and enabled at the output upon microinstruction (register RPL) respectively through wires 126 and 137, for which the inputs arrive on connection 151 from multiplexer MXB, driven by two wires of connection 139, coming from register RPL. Analogously to the case of register RGA, also RGB can be loaded with bus 22 sections 22a, 22b, 22c, 22d contents.

8-bit register RGE, which can be loaded and enabled at the output upon microinstruction (register RPL) respectively wires 125 and 138, whose inputs are connected to the least significant bits of bus 21, denoted as section 21d.

8-bit register RGD, which can be loaded and enabled at the output upon microinstruction (register RPL) respectively through wires 124 and 136, whose inputs are connected to the second octet of bus 21, denoted as section 21b.

The result of the operations carried out in arithmetic logic unit ALU8 is sent through connection 113 as input to 8-bit register ACC which can be loaded up on microinstruction (register RPL) through wire 127. ACC outputs, 8-wire connection 135, are carried in parallel to four groups of 8 three-state separators DR3,DR4, DR5,DR6 which can be independently microprogram-activated (register RPL) respectively through wires 141, 142, 143, 144, forming connection 140. Since said output groups are respectively connected to sections 22a,22b,22c,22d, of bus 22, thus it is possible to put the operation result on any section of bus 22, or replicate it on a plurality of its sections.

An 8-bit section of register RPL is connected, through 8-wire connection 149, to a group of 8 three-state separators DR2, which, in turn are enabled by wire 150 arriving from the microinstruction itself (register RPL). 8-wire output connection 148 is the same as the section 22d of the internal bus 22 and allows to carry on it a constant, directly from the microprogram. Another section of 6-bit register RPL is likewise connected together with connection 146 to six separators DR1, enabled by wire 147 arriving from the microprogram. Group DR1 outputs are connected, through 6-wire connection 145, to the least significant bits of section 22c of bus 22; also said bits have the aim of directly supplying a microprogram constant.

The 14 less significant bits of bus 22 form section 22g and are connected as inputs of a 14-bit register RAD and as outputs to the group of 14 three-state separators DAD. Register RAD can be loaded by a bit present on register RPL through wire 128 which is part of connection 129, and still can be enabled by an RPL bit through wire 132 which belongs to connection 130. Also group DAD can be analogously enabled by RPL through wire 131 of connection 130. RAD outputs and DAD inputs are in turn connected to bus 14 (arriving from FIG. 3) which is memory MEM addressing bus.

The following command wires, not yet described, also derive from microinstruction register RPL:

Wire 52, load criterium for FI3 which, through AND gate P08 of FIG. 3, which receives also from time base strobe wire 51, and wire 53 is sent both to FIFO memory FI3, designed to contain multipoint connection replicated cells, and to its control circuit CF3.

Wire 38, 'cell end' criterium (active on the last byte transferred), towards FI3.

Wire 32 enabling the outputs of register LIM.

Wire 31, loading command of register LIM.

Wire 30, signalling to an arbitrating circuit AMB the "busy state" of bi-port memory MEM as to what concerns the accesses by the processor, according to what will be afterwards described.

Wire 28, which is the writing command for memory MEM by logic LMP, through OR gate P06 and wire 27.

Wire 26, enabling MEM outputs on bus 21.

Connection 25, carrying the four enabling wires of the four sections of register LUM, connected to the relevant 4 sections of bus 22.

Wire 24 enabling the outputs of register LIB on bus 21.

Wire 23 which, through OR gate P03 and wire 20, enables towards memory MEM addressing register RG3 on address bus 14.

Wire 19 loading the register LUM, through the OR gate P05 and wire 18.

Wire 15 which, through AND gate P02, can block the selfstorage from time base of register RG3 addressing memory MEM.

An operating cycle of logic LMP begins with the test of wire 12, activated, as seen upon reception of a label. The logic remains in this state as long as the event takes place, then it makes a jump conditioned by the code present on connection 22e, whose possible configurations have been previously described. If the code corresponds to a multipoint connection cell, LUM section b (FIG. 3) contains the maximum number of memory sectors the call is authorized to occupy with its cells waiting to be duplicated, while section c contains the current number of waiting cells relevant to that call. Section d contains the number which has been locally allotted to the call (from 0 to 31), and the number of branches to the node (from 1 to 7).

Section b code is carried to the input connected to bus 117 of arithmetic logic unit ALU8, through 22b, multiplexer MXA, 120, RGA, while that of section c is carried to the other arithmetic logic unit ALU8, input through 22c, multiplexer MXB, 151, RGB, bus 118. Wire 116 carries to multiplexer MXT the comparison result, onto which the test is carried out to establish whether cell storage is authorized. Meanwhile the pointer to the table of free sectors can be addressed by a constant coming from microprogram through register RPL, 146 and 149, separators DR1 and DR2, 145 and 148, bus 22, register RAD and bus 14. The read pointer is directly stored by bus 21 section d onto register RGE. In case the preceding test gives an affirmative result, the jump is carried out conditioned by the code present on connection 112, coming from two bistables FF1 and FF2 which store respectively the situation of "memory sectors over" and "pending work queue filled up"; the operation proceeds only in case there are sectors available and work queue is not yet full; in that case arithmetic logic unit ALU8 increments by one the number of allotted sectors and, through 119,ACC, 135,DR5,22c, presents it on bus 22 to register LIM, which receives instead from register LUM the other 3 sections. Such an up-dated word is rewritten in the memory, still addressed with the label present on RG3, since LMP, through wire 15 and gate PO2, has prevented, until that instant, further loading. By using the pointer previously loaded on register RGE, the number of the sector wherein the incoming cell is to be stored is read by memory MEM. The address is carried onto register RGC through bus 21. On this register the number is converted into the initial sector address by a position exchange and the addition of fixed bits of the basic address of the sector region. At the same time the sector number is loaded on register RGD from bus 21. The pointer to the table of free sectors, up-dated by arithmetic logic unit ALU8 whereby it is incremented by a unit, is re-stored into the memory, after controlling whether it has reached the table end, in which case bistable FF1 is activated. By using the address still present on register RG3, the number allotted to the call and the number of branches are transferred to RGE, while registers RGA and RGB are used as work registers.

Meanwhile the arriving octets are automatically loaded onto register LIB of FIG. 3 by circuit CAB, slaved to the time base, through the four command wires of connection 16; whenever LIB contains four new octets, they are transferred into the memory at the address which is obtained by adding the contents of sector-beginning register RGC, with the suitable increasing constant supplied by the microprogram.

In the periods in which register LIB is loaded, logic LMP loads into the pending task queue the new tasks consequent upon the cell whose storage is in progress. To this end it uses another table present in the memory, which contains 32 8-word zones, a zone for each of the possible multi-point calls, containing in turn up to seven self-routing codes and labels relevant to the seven possible branches, while the eighth word (written on top of the zone) contains the label by which the call cells arrive at the node. For each cell which is to be forwarded a word is prepared containing in the first octet the number of the sector wherein the cell is memorized, in the second octet the self-routing code wherewith cell is to be sent to connection network, and finally, in the last two octets, the new label is to be given to the cell. Since the available sectors are 128, the most significant bit of these words is always a logic zero. Said words, as many as are the branches, are written in the queue of the pending tasks, whose pointers (address of first task and number of queuing tasks) are updated one at a time. This operation is repeated as many times as there are the correspondents.

The last word written as pending task contains instead a one in the most significant bit, the sector number and the arriving cell label. To obtain this word, the arriving label is retrieved from RG3 (which in this case has the automatic load blocked, as already seen, and hence continues to maintain the label code), through bus 14, separators DAD and section g of bus 22. If almost 8 free positions do not remain in the queue at the end of the task, bistable FF2, which indicates "queue filled up", is activated.

Every time the incoming cell is not relevant to a multipoint connection, from the first conditioned jump examined, logic LMP passes to control the presence of queuing tasks. The pointers to the queue are read to this aim, by addressing them as before by a constant supplied by microprogram and by checking in arithmetic logic unit ALU8 whether the number of tasks is different from zero. The first task is addressed and loaded on register LUM; wire 22f is the most significant in the word contained in register LUM and is carried to multiplexer MXt to be controlled, in order to establish whether the task consists of cell transmission towards connection network or if it deals with the release of a sector wherefrom the cells have already been retransmitted. At the same time, registers RGC and RGD are loaded directly from bus 21.

If the operation requested is the retransmission of a cell, on RGC, there is then the initial address of the sector wherein the cell itself is stored while register RGD contains the same information in the format of sector number. In this case the microprogram controls wire 55 arriving from circuit CF3 in order to check whether FIFO memory FI3 can accept the cell which is to be emitted. If that is not possible the task is deferred to the following cycle. If the test is favorable queue pointers are up-dated and taken back to the memory. Section b of the register LUM and of bus 22 is connected to FI3 inputs. On this register section there is the self-routing code, first octet to be loaded in FI3. The section is enabled and on wire 52 the microprogram gives an order of loading. Meanwhile section c of register LUM, which contains the first label octet, is enabled on the relevant section of bus 22 and therefrom transferred to register RGA through multiplexer MXA duly selected. Afterwards the octet is sent to register ACC through arithmetic logic unit ALU8, and finally therefrom to section b of bus 22, through separators DR4, wherefrom it can be transferred to memory FI3. Section d octet can be analogously transferred.

At this point, the words contained in the sector of the cell to be transmitted, loaded on register LUM and therefrom sent to memory FI3 as described, are read by using the address contained in register RGC added to the suitable increasing constant. The memory loads besides the octet a ninth bit coming from wire 38, which is placed at high level on the last octet loaded and helps indicate the cell end.

If the task to be carried out is however the release of a sector whose data have already been transmitted to all the branches, on register LUM, section a, there is the number of the sector to be released and place again in the table, while the sections c and d contain the arriving call label which has occupied the sector. The sector number is loaded also on RGD. After updating and rewriting queue pointers as before, the original label is transferred from register LUM to register RAD through bus 22 and used as a memory address. Thus it is possible to update it by decrementing it, the number indicating the memory sectors currently occupied by the cells of that call. The sector number is then rewritten in the table of the free sectors and the relevant pointer is updated.

Bistable FF1 indicating the sector end is also reset, whenever active.

Every time a queue task is carried out, bistable FF2 which is an indicator of filled up queue, whenever active, is reset too.

The access to memory MEM by the processor takes place as follows: the processor places the address onto bus 39, and signals it on control wire 42, while the address part forming the memory bank code is controlled by a comparator CM1 (FIG. 3) on wires 39a. AND gate PO7 receives from comparator CM1 on wire 41 the comparison result and on wire 42 the processor signal, hence, through wire 40, loads on register RG4 the useful address part, and with the same wire communicates to the arbiter AMB the beginning of the cycle of access to the memory.

Arbiter AMB receives also from logic LMP on wire 30 the information relevant to the phases in which the memory is free and can then decide whether to accept the cycle or make it wating through wire 47 towards the processor. If or when the memory is free arbitration circuit AMB enables register RG4, through wire 43, on bus 14 and thus addresses the memory. Through wire 46 the processor communicates to arbitration circuit AMB whether the cycle is a reading or writing cycle and, in the latter case, on wire 47 emits the writing pulse. According to the case, arbitration circuit AMB will enable transceivers TR1 in outgoing or incoming direction through 2-wire connection 44, and whether necessary, it will emit the writing pulse on wire 29 towards the memory through OR gate PO6, which receives also writing wire 28 by LMP, and wire 27.

FIFO memories FI1, FI2, FI3, loaded with the cells received as previously described from circuits using the clock extracted from the incoming data flow, are forwarded at rhythms obtained from the clock used in the connection network. To this end memories FI1, FI2, FI3 are independent reading and writing memories (even contemporaneously on different cells) and control circuits CF1, CF2, CF3, which keep the counting of the cells present in the memory, communicate with it with the well known double sampling technique.

Figure 5:
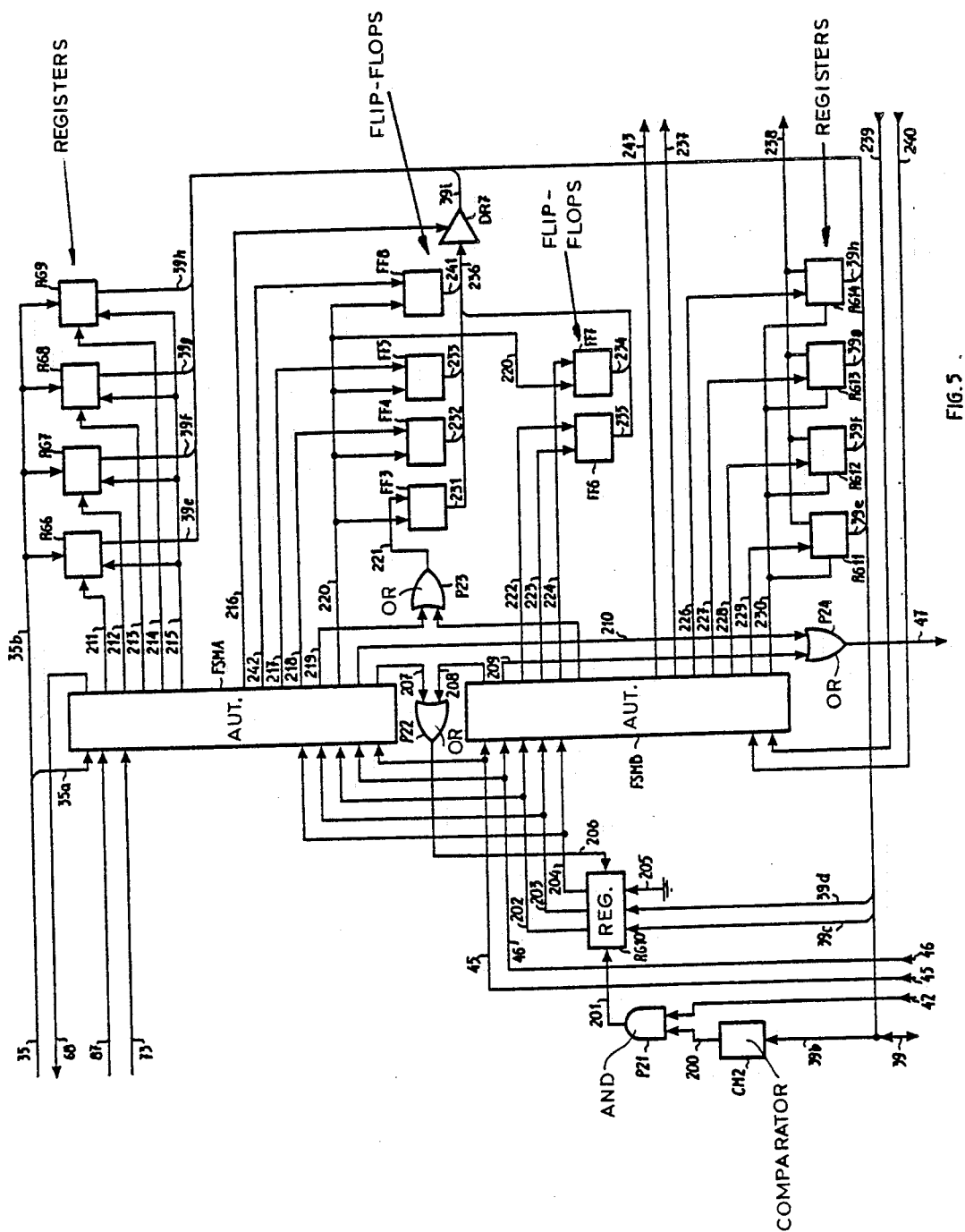
FIG. 5 is a diagram of the parallel interface of the block denoted by TMA in FIG. 2.

What has been said is valid also for memory FI4 and the relevant control CF4, connected to parallel interface of dialogue towards the processor depicted in FIG. 5, which will afterwards described.

When in memory FI1 there is at least a complete cell, consisting of 33 octets the first of which is the self-routing code, the second and the third the new label and the remaining 30 are the useful data contained in the cell received and transferred to FI1, circuit CF1 activates wire 84 of transmission request towards a circuit ARU, which is a simple and well known arbitrating circuit between the requests coming from the three circuits CF1, CF2, CF3, of which CF2 places its request on wire 85 while CF3 uses wire 86; the priority is allotted by ARU in a cyclical way. ARU reply wires are as follows: wire 58 towards CF1 and FI1, wire 63 towards CF2 and FI2, wire 56 towards CF3 and FI3. On said wires (one at a time) ARU supplies the 33 unloading pulses to the selected circuit, which places its octets in succession on bus 34 towards the connection network.

The dialogue towards the connection network and the arbitrating circuit of bus 34 (circuit ARB of FIG. 2) is carried out by the request arbitrator ARU as follows: the access request to bus 34 is placed on wire 80. Request arbitrator ARU waits for the acknowledgment on wire 79. Once having obtained the acknowledgement, it gives as seen, the unloading order to the selected circuit and activates the data-ready wire 82 towards the network. The backwards signal of data-seized waits on wire 81, and upon reception it resets wires 80 and 82, waits for reset of wire 81 and hence it starts again the cycle till it unloads the 33 octets. The clock signal used for these operations is given by wire 83 which carries the connection network clock.

As to the unloading of group FI4, CF4 towards the processor, reference is made also to FIG. 5, which represents the parallel interface through which the processor can receive the cells meant for it and coming from the line, and as will be seen, can send cells onto the line in outgoing direction.

When, at least a complete cell is present in memory FI4, circuit CF4 activates wire 87 of load request towards the said interface, which places the data on 9-wire connection (one octet plus a signal of last octet) denoted by number 35. Wire 73 is the alarm of non-allotted label, emitted by FSM8 when the code received on connection 22e corresponds to such a situation. This signal is converted into the activation of a bit of the state register of the parallel interface.

FIG. 5 shows the 32-bit parallel interface for allowing information exchange under cell format between the asynchronous multiplex forming the line flow and the control processor. This information basically consists of the signalling flow, to which the supervising flow is added.

The processor has access to the interface through its 32-wire bus 39, with which it dialogues with the memory MEM as already seen, and with the same control wires. Section 39b of the bus comprises the wires carrying the part of address forming the interface indicative, whose internal registers are seen by the processor as memory locations. The addresses of interest are four in number and correspond to 32-bit words, as in this case 32 bits of address refer to an octet of the word, the indicative consists of the 28 most significant bits of the address, while two of the last four select the particular word inside the interface and the other two are non-significant.

Connection 39b is connected to an identity comparator CM2, activating wire 200 every time the code present on 39b corresponds to code cabled inside the comparator itself. Control wire 42 coming from the processor indicates whether it is an address. Wires 200 and 42 are the inputs of AND gate P21, whose output, wire 201, is the load signal of register RG10, connected to wires 39c and 39d of bus 39 which carry the code to the requested internal address (the whole word is always addressed). RG10 loads also a third bit, wire 205, which is a fixed high level and which has the aim of signalling the beginning of an access cycle.

The corresponding wires outgoing from register RG10 are respectively 202, 203, 204, which are carried to two finite state automatons FSMA and FSMB, together with control wires 45 and 46 coming from the processor, whose functions are the same cited in the description of the processor access to memory MEM.

The first of the four addresses relevant to the interface allows the processor to read 32-bit word, whose octets are contained in registers RG6, RG7, RG8, RG9. To this end, finite state automaton FSMA enables the output of said registers on bus 39 (respectively sections 39e, 39f, 39g, 39h) by means of wire 215, replies to the processor on wire 210, OR gate P24, wire 47 and, upon the cycle end, reset register RG10 through a pulse on wire 207, OR gate P22, wire 206. The second address allows the processor to read on a word the bits contained in bistables FF3, FF4, FF5, FF6, FF7, FF8 while the remaining bits of the word remain non-significant; to this aim it enables separators DR7 through wire 216, on section 39i of bus 39. The input of the separators is connection 236, comprising wires 231, 232, 233, 234, 235, 241 coming from the outputs of the preceding bistables. The reading cycle proceeds as before, with the exception that at the end, a pulse is emitted also on wire 220 which deactivates bistables with the exception of FF6.

The third address of the interface allows the processor to write a 32-bit word coming from bus 39 through its sections 39e, 39f, 39g, 39h on registers RG11, RG12, RG13, RG14. To this end there is automaton FSMB intervention which gives the load pulse on wire 230 to the said registers, replies to the processor through wire 209, OR gate P24 and wire 47 and finally resets register RG10 through wire 208, OR gate P22 and wire 206. The last address the interface replies to is used for a writing cycle tho which finite state automator FSMB replies as before, but does not carry out register load; such a cycle serves, as will be seen, to confirm or possibly recover the initial state of transfer of a cell from the processor to the line.

Wire 87 is coming from memory block FI4, CF4 (FIG. 3) already described, when the block contains at least a complete cell, carries the unload request signal to automaton FSMA, at the same time it places the first octet of cell to be unloaded on connection 35. If registers RG6, RG7, RG8, RG9 are free, i.e. if, as will be seen, their reading has already been carried out after the last loading, finite-state automaton FSMA replies with a signal on wire 68 and at the same time it loads the contents of the 8 wires of octet of connection 35 on register RG6 with a pulse on wire 211. CF4 deactivates wire 87, finite state automator FSMA deactivates wire 68 and controller CF4 activates again wire 87 to transfer the second octet. By this mechanism 4 octets are loaded in succession on register RG6 as seen, register RG7, RG8 and RG9 with pulses on wires 211, 212, 213, and 214 respectively. At this time finite state automator FSMA emits a pulse on wire 219, which through OR gate P23 and wire 221, activates bistable FF3, and a pulse on wire 218 which activates bistable FF4. The contents of FF3 indicates the presence of a new significant datum on the word formed by bistables, which on the whole will be named state register, while FF4 indicates the presence of a datum on the preceding registers which on the whole will be indicated as incoming datum register.

The processor reads the status register, and when it finds there a data-ready signal at the input, reads the relevant datum register. Such a reading takes place through FSMA which can successively load a new 4-octet word and repeats the operations on the state register. The processor reads again the state register to control the presence of a datum on the corresponding register and so on.

Wire 35a of bus 35 signals, as seen, the presence of the last octet of a cell what corresponds to a loading of register RG9; if finite state automator FSMA receives this criterium in a different phase it will signal a malfunctioning alarm by loading FF3 and FF5.

A possible non-allotted label signalling received, carried by wire 73, causes the loading of FF3 and FF8 of state register.

As to what concerns the transmission of a cell from the processor towards the line, finite-state automaton FSMB loads on FF7 through wire 224 the criterium of free outgoing datum register, while on FF6 repeats the congestion state or lack of it of the downstream path which will be described hereinafter; it does that by transferring on wires 222 and 223 by pulses the variations it receives from wire 240, which carries this type of signalling. By reading the state register the processor makes sure that the last written datum has been forwarded; before beginning the first transfer of a new cell the processor carries out a writing at the fourth address, which confirms or forces the initial state of automaton FSMB. At this point it writes a word containing the first 4 octets of the cell registers RG11, RG12, RG13, RG14. At the end of the writing cycle FSMB enables with wire 229 register RG11 and at the same time places downstream the data-ready octet signal on wire 237. The octet is enabled on 8-wire connection 238. It waits then data-seized signal from wire 239, the transfer proceeds as usual and the successive 3 octets are enabled respectively by wires 228, 227, 226. Once the first transfer is over finite state automaton FSMB activates again FF7 and the cycle is starts again up to the last word whereupon, in correspondence with the last octet FSMB activates also wire 243 which forms the relevant signalling.

Figure 6:
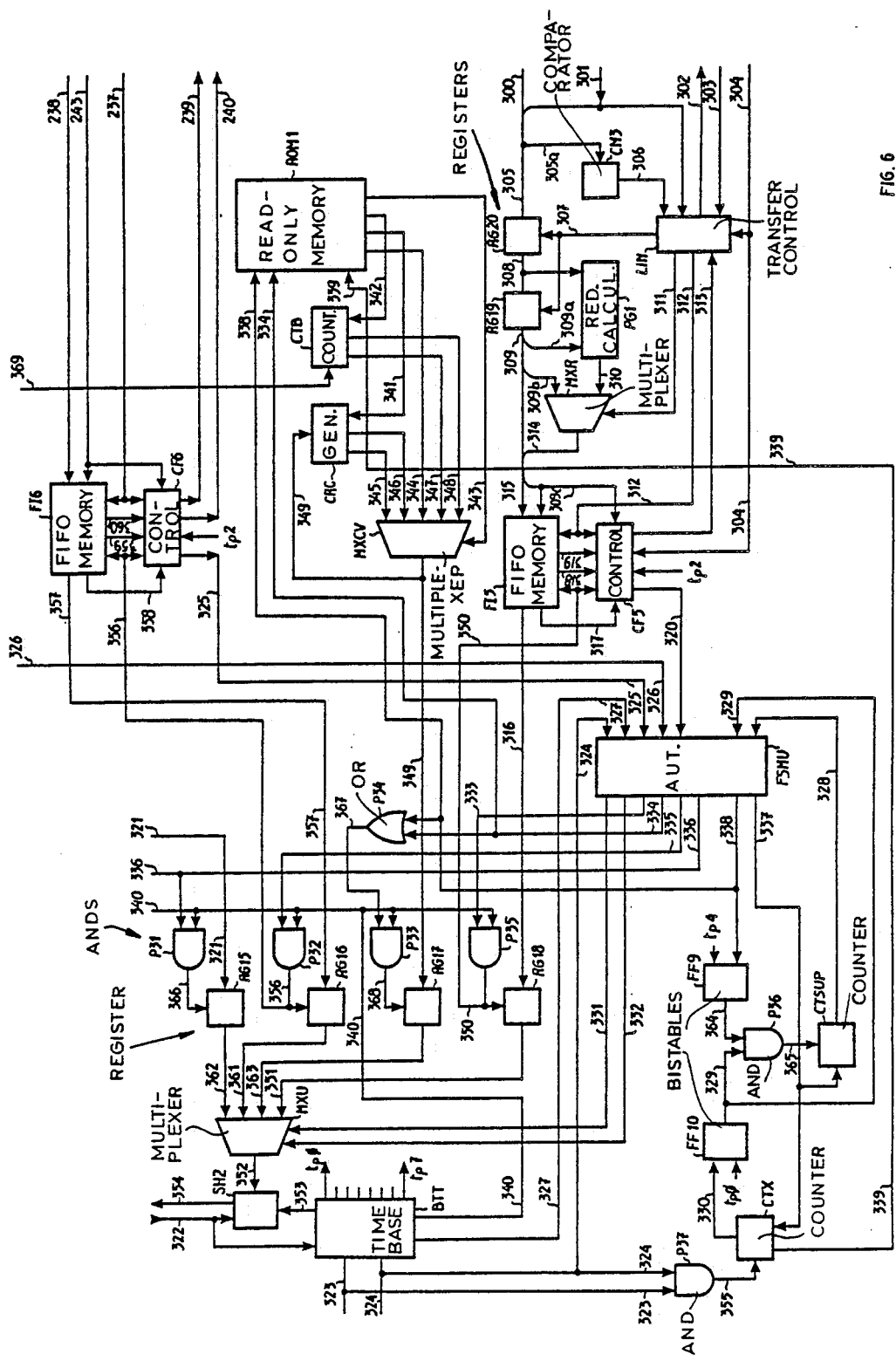
FIG. 6 is a diagram of the transmission section of the block denoted by TMA in FIG. 2.

FIG. 6, which is referred to in the following description, represents the logic scheme of the outgoing section of block TMA.

Cells meant for the interface and coming from the connection network are transmitted by bytes with a dialogue of the same type as seen for the incoming section. The first byte of each cell, owing to the type of network used, is the code of the interface by which the cell has been emitted, the second byte, as already seen, carries a code of three bits indentifying, in the arrival interface, destination termination TMA.

8-wire connection 300 carries the cell octets, wire 301 is the ninth bit, active on the last octet of each cell, wires 302 and 303 carry control signals for octet transfer, finally wire 304 carries clock signal of interconnection network. Connection 305 is nothing else but connection 300 and wire 301 of the ninth bit and is connected to the inputs of 9-bit register RG20.

Connection 305a is formed by three wires of connection 305, which corrresponds to the position of termination indicative on the second octet.

A circuit LIN, adapted to carry out the transfer control, is now at the initial state after each initialization of the interface and after the reception from the connection network of a signal of the last octet of a cell. To this end it receives wire 301. Under this situation, a signal on wire 303 indicates the presence of a first cell octet, which is non-significant for the block TMA, circuit LIN does not reply on wire 302 and the octet is seized by distributing circuit DIS of FIG. 2.

The successive octet is that containing the termination indicative, whose code is presented by connection 305a, to comparaison circuit CM3, containing the cabled termination code. If between the two codes there is identity, wire 306 outgoing from CM3 communicates to LIN that the arriving cell is meant for the termination and hence LIN enables its reception; otherwise LIN does not reply to the octets of the cell presented on 300 and uses only the criterium of wire 301 to return to the initial state at the end of the cell.

When on the second octet received CM3 activates wire 306, circuit LIN is activated, through wire 307 it loads the octet and the ninth bit on register RG20 and replies on wire 302 with the data-seized signal. At the arrival of the successive octet, the load pulse on wire 307 carries the first useful octet on 9-bit register RG19, through connection 308 and the second octet on RG20. The two registers thus contain the label of the cell which is to be forwarded. Connections 308 and 309a carry to circuit PG1 the 13 significant label bits, whereupon circuit PG1 calculates the three redundancy bits which are placed on connection 310, to replace termination code bits, useless by now.

Connection 309 outgoing from RG19 is subdivided into connections 309a, consisting of five octet wires which are in positions which do not carry redundancies; 309b, which consists of three octet wires on redundancy position; 309c, which is the ninth bit, with the function of signalling the last cell octet. Multiplexer MXR receives on one side connection 310 and on the other side connection 309b and is hence capable of forwarding (connection 314) either redundancy bits computed by redundancy calculator PG1 or the bits received on register RG19. MXR command arrives on wire 311 from circuit LIN.

The cell is to be stored in a FIFO memory F15, always with nine bits, controlled by circuit CF5 (which receives its state through wires 317, 318, 319, more particularly wire 317 indicates a last octet of one outgoing cell), which communicates to LIN on wire 313 the possibility or lack of it for memory FI5 of accepting the octets. When wire 313 gives the consent, LIN communicates the load pulse to FI5 and CF5 on wire 312 and thus the loading of the entire cell proceeds. The octet is presented to memory FI5 on connection 315 which rebuilds it with 314 and 309a. The last octet is indicated by activation of the ninth bit on wire 301, and hence subsequently of wire 309c, when the last octet reaches register RG19. Such indication is loaded in memory FI5 and communicated to controller CF5.

Another source of cells to be transmitted on the output multiplex consists of signalling cells emitted by the processor through the previously-described parallel interface (FIG. 5). Here the octets of the cells are emitted on connection 238, while the ninth wire, indicative of the last octet, is 243, wire 237 is that of data-ready, while, as will be seen, wire 240 communicates backwards possible congestion states.

In FIG. 6 connection 238 is received as input from FIFO memory FI6, together with wire 243 of the ninth bit. Memory FI6 is equipped with usual control circuit CF6, which as far as load is concerned, receives wire 237 of data-ready (load command) and sends again on wire 239 the data-seized signal; the possible signal of filled up memory is communicated on wire 240.

Possible cells arriving from the auxiliary input are directly received by register RG15 on 8wire connection 321 arriving from outside; the way of forwarding said cells will be examined hereinafter.

Circuit FSMU is a finite state automaton controlling cell output and arbitrates its various sources. Its operation is driven by block BTT which is the transmission time base, which obtains the various periodic signals from transmission bit clock (wire 322), the relevant octet synchronism (wire 323) and mask signal (wire 324) for said octets which will be used by the transmissive means as service octets, in a manner analogous to the reception.

FSMU inputs are the following: wire 320, coming from CF5 and carrying the transmission request of the cells contained in memory FI5; wire 325, arriving from CF6 and carrying the analogous request for the cells contained in memory FI6: and FI6; wire 326, coming from the outside and carrying the request of transmission of possible cells coming from the auxiliary input. Wire 327 carries the periodic pulse (automaton cycle) from time base BTT, while wire 324 is that of the mask, which in advance of an octet, signals the request of transmission interruption of useful data to allow the forwarding of a service octet. Wire 328 arrives from counter CTSUP, which counts cells being transmitted and requests the transmission of a supervising cell every N transmitted cells. Number N is settable as one likes and in this case it is 1023. Finally wire 329 carries the criterium of transmitted cell end, comes from bistable FF10 which synchronises it at the useful instant after having received it on wire 330 as a signal of end-of-count of counter CTX, which, in turn counts transmitted octets.

FSMU outputs are the following: wires 331 and 332, which control output multiplexer MXU with four 8-bit paths, through which the cell to be transmitted is selected; wires 333, 334, 335, 336 which are respectively the enablings to loading of output registers of the four paths, which will be described hereinafter; wire 337, relative to synchronism of counter CTX of the transmitted octets, which is activated at the beginning of the transmission of a cell and causes also the advance of counter CTSUP of the transmitted cells; wire 338 towards the read-only memory ROM1 enabling the transmission of a supervising cell.

The functions which FSMU is to carry out are the arbitrating among the sources of the cells to be transmitted and the unloading of the same cells at the rhythm demanded by the outgoing line, releasing the intervals signalled by the mask wire 324. Since the line cell flow is to be continuous, means are provided to transmit stuffing cells when there are no more ready cells. Besides FSMU provides periodic supervision cell transmission. To this end a fourth cell source is provided, consisting of read-only memory ROM1, which contains the stuffing cell (by octets) and the invarying part of the supervision cell, and of other circuits which will be described hereinafter.

When memory FI5 contains at least a complete cell, circuit CF5 signals it to FSMU through wire 320. Automaton FSMU waits from counter CTX, wire 330, FF10 and wire 329 the signal of preceding cell transmitted, and if wire 328 from counter CTSUP does not request the transmission of a supervision cell, and there are no further prior input requests, enables the output of the cell by activating wire 333, which opens AND gate P35 which on its second input receives through wire 340 a rythmical pulse from time base BTT.

Each pulse outgoing from P35 on wire 350 causes the loading of register RG18 which receives the octet outgoing from FI5 through 8-wire connection 316, and causes also the unload, on the same wire, of an octet from FI5 and the presence at the output of the following one. At the same time FSMU forwards on wires 331 and 332 the code of selection of multiplexer MXU with four 8-bit path MXU, so as to enable the passage of the contents of connection 351 arriving from RG18, towards the output connection 352, which presents the octet at the parallel input of shift register SH2. At a convenient time, time base BTT causes the parallel loading of such a register with a pulse on wire 353. The contents is then transferred in series towards the asynchronous output multiplex on wire 354 by clock pulses arriving from transmission modem on wire 322.

The octets thus transmitted are counted by counter CTX which receives the relevant pulses from wires 323 (octet synchronism) and 324 (mask) through AND gate P37 and wire 355. The cell end signal is communicated to FSMU as previously seen and FSMU replies by resetting CTX and advancing CTSUP through wire 337.

When the request of transmission accepted is the one coming through wire 325 from CF6, which controls the FIFO memory FI6 by means of state wire 359 and 360, the things proceed analogously to the preceding case: FSMU activates wire 335 towards AND gate P32, while wires 331 and 332 towards MXU select the 8-wire input connection 361 coming from RG16, loaded by wire 356 which sees also to unload the memory FI6. The octets transferred are counted as before.

The situation for a request arriving from the auxiliary input on wire 326 is however different. In this case no FIFO memory is present; FSMU enables through wire 336, AND gate P31 and wire 366 the loading of register RG15, while with wires 331 and 332 selects MXU on connection input 362 coming from the same register. The enabling signal 336 and clock signal 340 are sent to the outside wherefrom the octets to be transferred will be sent onto connection 321 towards register RG15. The remaining is analogous to the preceding cases.

If, at a cell transmission end, counter CTSUP emits on wire 328 the end-of-count signal, FSMU prepares the transmission of a supervision cell and to this aim activates wire 334 towards OR gate P34 and read-only memory ROM1, if however there are no further cells to be transmitted FSMU activates towards ROM1 and gate P34 wire 338 for the transmission of the stuffing cell. Connection 339 carries to ROM1 the octet code in transmission, contained in CTX.

ROM1 outputs are: 8-wire connection 344, which carries to one of the five inputs of multiplexer MXCV the octet which time by time is to be transmitted, 3-wire connection 343 carrying the selection code of the inputs to the same MXCV, wire 342 for resetting the counter CTB, and at last connection 341 towards block CRC. Counter CTB is a 16-bit counter which is incremented by pulses on wire 369 (wire 73 of FIG. 3) generated by FSM8 (FIG. 3) every time an irregular situation takes place as e.g., a congestion at the input, while block CRC is a usual 16-bit redundancy generator with parallelism at 8 bits retrieving the data upon which to calculate the redundandy itself from 8-bit connection 349 outgoing from MXCV towards register RG17. On connection 341 ROM1 supplies the starting signals, the calculation, the emission of the result, which is divided into two octets on connections 345 and 346 towards two inputs of MXCV. The last two inputs of this multiplexer are connected to two octets forming CTB contents.

Wire 367 outgoing from gate P34 is the signal enabling to the loading of register RG17, through AND gate P33 and connection 368. To emit a stuffing cell FSMU, beside the actions described, places one wires 331 and 332 the selection code of the input of MXU connected to register RG17 through connection 363. The octets stored in ROM1 and addressed by connection 339 and by wires 338 and 334 are afterwards tramsmitted towards connection 344, MXCV, connection 349, RG17, connection 363, MXU, connection 352, SH2, and wire 354.

For the transmission of a supervising cell block CRC is activated, two label octets are forwarded by ROM1 as before, followed by the two octets contained in CTB; other octets coming from ROM1 follow and finally the last two octets of the cell are retrieved by block CRC.

Figure 7:
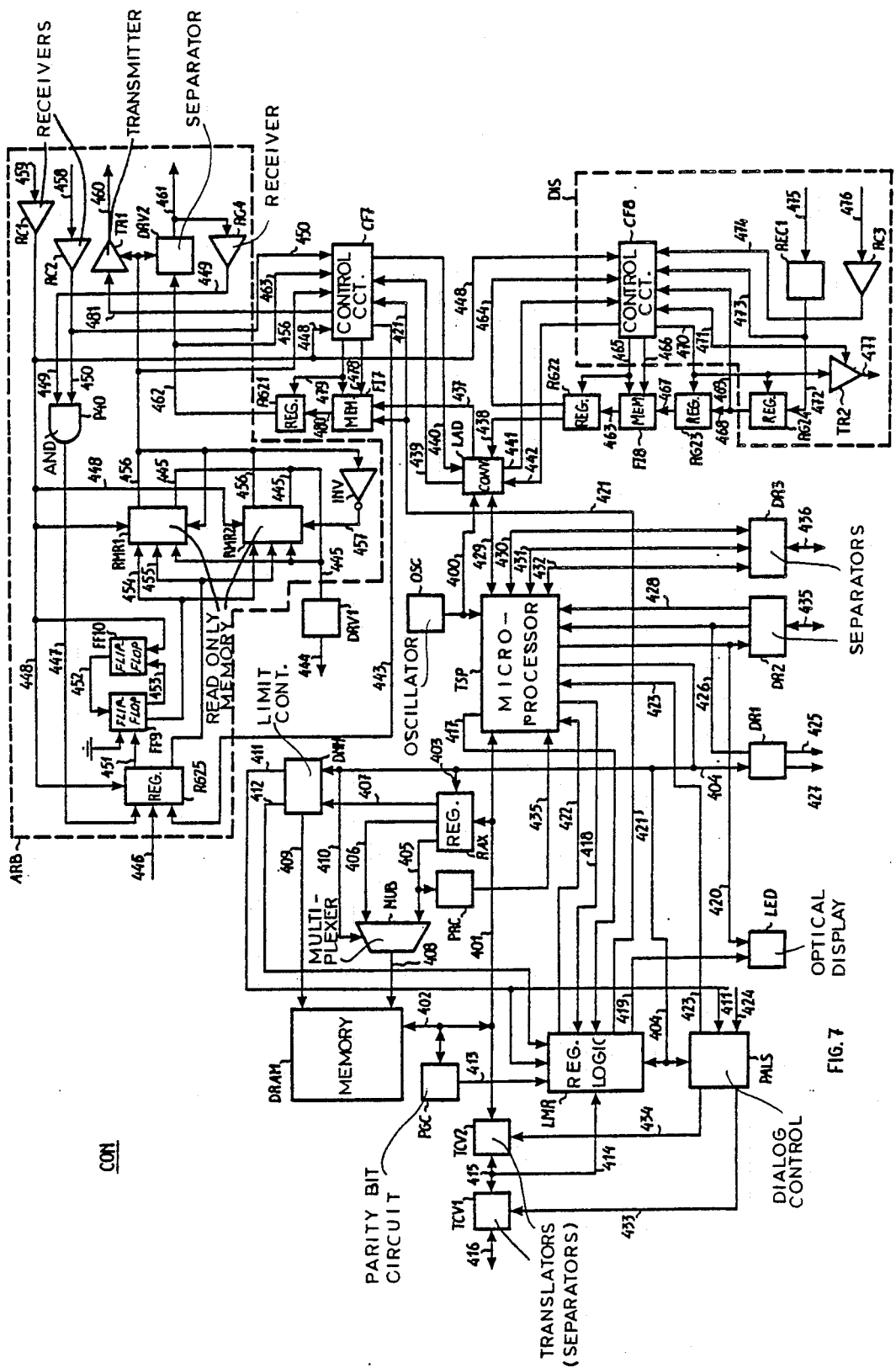
FIG. 7 is a diagram of blocks denoted by ARB, CON, and DIS in FIG. 2.

FIG. 7 represents blocks denoted by CON, ARB and DIS in FIG. 2.

Control block CON, in this embodiment, is based on a microprocessor T414 "Transputer", but this is not limiting since any 32-bit microprocessor of convenient performances can be used in the scheme. What characterizes the block and renders it original and functional to this application and to a part of it, is its possibility of connection to the incoming and to the outgoing buses of the connection network, through which it can exchange messages with the other control blocks present, since such messages have a format equal to that of data and signalling cells. It can emit towards the same network the signalling cells which are to be forwarded onto an outgoing multiplex non connected to its interface, and also data cells towards any subscriber.

The same thing can be carried out on the multiplexes connected to its interface terminations, through the bus and the interfaces previously described.

These characteristics allow the controls present in the interfaces connected to the connection network to act as a control multiprocessor which uses very powerful communication means offering it considerable efficiency.

Terminals for a communications ring comprising the processors examined and the supervision processor are also provided, with the aim of maintaining the traffic separated of the supervision messages, which have no statistically-uniform distribution as the managing ones, but are all going towards and coming from an only point, and this characteristic, as known, would degrade connection network performances.

As to what has been previously mentioned, the part relevant to the processor will not be further described in detail, but only roughly depicted, since it is a known scheme. Block TSP is microprocessor T414, which receives from wire 400 the clock signal at 5 MHz, generated by circuit OSC; connection 401 is the internal address and data 32-wire bus. Towards memory DRAM bus connection becomes a 36-wire connection (402) since the memory itself is controlled by four parity bits, managed by circuit PGC. Memory DRAM is dynamic and has a 2 Mbyte capacity, its address is extracted by bus 401 and registered on register RAX whose load pulse (wire 403) is extracted by connection 404, consisting in turn of service wires outgoing from the microprocessor for the control of the memory cycles. The outputs of this register are grouped into 3 connections, 405, 406, 407 which are respectively the part of row and column of the memory address and the part of address indicating the memory bank it refers to. The first two connections are sent to memory DRAM through multiplexer MUB and connection 408, while connection 407 is sent to circuit DMM, controlling possible violations of memory limits and which, receiving also control wires 404, generates on connection 409 control signals towards DRAM. Multiplexer MUB is controlled by wire 410 of connection 404, while from DMM outgoes wire 411, communicating with circuits LMR and PALS when the address selected corresponds to one of the two internal registers contained in LMR, and wire 412 which on the contrary indicates a possible violation of memory boundaries to LMR.

Circuit LMR still receives on connection 413 the indication of possible parity errors, and is connected to the low octet of the internal bus 401, through connection 414. Bus 415 in fact is still logically bus 401, whose electrical levels have been restored by translators TCV2. LMR contains two 8-bit registers whereupon there are respectively recorded possible errors of the types already examined, and the automaton state flag; such registers can be read and written by the microprocessor and to this aim LMR receives also control wires 404. Through wire 422 LMR signals the presence of error situations to TSP, which replies with a signals on wire 418. Wire 417 which from TSP reaches LMR carries 20 MHz clock obtained from the same TSP while connection 419 carries the alarm signals to optical display LED, which is also reached by wire 420 arriving from TSP, microprocessor self-diagnosis alarm.

Circuit PALS controls the dialogue towards blocks TMA, as well as the enabling of bidirectional separators TCV2 for the dialogue with the internal registers. Its inputs are wires 404, wire 411 and wire 424 arriving from units TMA (denoted as wire 47 on FIG. 3), and its task is that of generating enabling signals for separators TCV1 and TCV2 and wait criterium (causing a slowing down of the memory cycle) on wire 423 towards TSP during the accesses to locations present on connected units TMA.

The block control comprises also a general reset wire 426, arriving from the outside, which is sent also to blocks TMA through separators DR1, together with control wires 404. At their outputs they are indicated as wires 427 and 425 respectively and comprise the wires which on FIG. 3 were denoted as wires 42, 45, 46, 47. Inside the block wire 426 is sent to TSP, which uses it for its initial configuration. To this aim there is read-only-memory PRC which contains configuration information; during the initialization phase TSP addresses this memory through bus 401, RAX and connection 405, therefrom receiving the contents on wire 435.

Wire 421 outgoing from LMR depends on a particular automaton flag use and will described hereinafter.

In the case, such as that of the present embodiment, in which a T414 "transputer" processor is used, the four serial bidirectional lines 429, 430, 431, 432 are available for the exchange of information with the microprocessor, each consisting of a pair of wires (one per transmission direction), according to the known dialogue protocol described in the technical publications of the microprocessor itself (such lines can be obtained by usual interfaces with any microprocessor).

In this case three of these lines are available from the outside through bidirectional separators DR3 and 6-wire connection 436 and can be used to implement, e.g., a ring connection towards a supervising processor, while the fourth, i.e. pair 429, is used to receive and transmit messages, having the format of a cell, from and towards the connection network. To this aim it is connected to circuit LAD, which is a commercially-available series-to-parallel converter, apt to handling the microprocessor serial-lines. LAD receives on wire 400 the clock signal for its operation.

When the control is to emit a cell towards the connection network, it transmits the first octet onto the outgoing wire of pair 439 towards LAD which places the octet in parallel on 8-wire connection 437, towards FIFO memory F17, which in turn is controlled by circuit CF7, towards which LAD sends the octet load request upon wire 439. If the memory can contain a whole cell, CF7 generates the loading of the octet through a pulse on wire 478 and replies to LAD on wire 440. The thing is repeated till the last octet but one; as far as the last octet is concerned, it is necessary to signal it as already done in the preceding cases. To this aim wire 421 is present, being arrived from one of the automaton flags present in LMR. The processor first activates this flag and then presents the last octet to be loaded into FI7, after the load the flag is reset.

At this point circuit CF7 presents on wire 443 the ready-cell criterium, which is the request presented at the arbitrating circuit; the cell in fact is to be forwarded to the input of the connection network concurrently with the cells arriving from the associate units TMA.

Wire 443 presents such a request at the input of register RG25, which receives also, on connection 446, the analogous requests made by units TMA which are present. Said connection is hence formed by a number of wires up to seven; the wire considered in each TMA is the one denoted by 80 in FIG. 3. Register RG25 receives also wire 447, arriving from AND gate P40, which has as inputs the criterium of octet seized by the interconnection network and the criterium of last octet given by the network; the first arrives from wire 458, receiver RC2, wire 450 while the second arrives from 9-wire connection 461 towards the connection network, wherefrom wire 449 is derived through receiver RC4.

The clock signal of the connection network arriving from wire 459, receiver RC1, wire 448, is also used for the loading of RG25. The cell forwarding requests, as well as the criterium of preceding cell forwarded, are thus synchronized with the network clock on the output of register RG25.

Bistables FF9 and FF10 have the function of generating on wire 454 the signal enabling the arbitrating, which lasts a network clock period; to this aim the output RG25, which corresponds to the input of the criterium of end of the previous cell is sent with wire 451 to FF9 input, whose control input is connected to a fixed low level. When wire 451 is activated, wire 454 gives the criterium examined while wire 453 sets the return to idle state of FF9 on the following clock pulse, the latter in fact loads the low level on FF10, which through wire 452 resets FF9.

Two circuits RMR1 and RMR2 are read-only memories with register on the output, which implement the arbitrating state automaton and receive at the input the access request to the connection network on connection 455 arriving from RG25, the enabling considered, on wire 454 and the internal state, which carries also the information of the source which is enabled, and is sent again to the inputs by the outputs. Wire 456 at the output, besides discriminating which memory is active (by driving the enable of the outputs of RMR1 and RMR2 through the inverter INV and wire 457) indicates also when F17 is authorized to forward its data. 3-wire connection 445 is decoded by DRV1 which forwards on connection 444 the enable signals to connected TMA; the said connection is hence formed by wires that in FIG. 3 are denoted by 79.

When due to a request on wire 445, wire 456 is activated, control circuit CF7 which receives in turn network clock 448, with pulses on wire 479 generates the loading of register RG21 and the unloading of FIFO memory FI7 on the register itself, through connection 480. The register outputs are carried through connection 462 and separators DRV2 to connection 461 towards the network. Wire 463, i.e. the ninth bit of connection 462, communicates to CF7 the transmission of the last cell octet, while wires 450 and 481 (which crosses transmitter TR1 and becomes 460) are the wires of data-ready and data-seized signal wires.

Nine-wire bus 475 arrives from the connection network and carries the outgoing cells meant for ICM (the ninth wire has always the same meaning as indicator of the last octet), together with dialogue wires 476 and 477 (of data-ready and data-seized respectively). As already said, such cells consist of thirty-three octets, of which the first is the indicative of sender ICM, useful only if the addressee is the control processor, while the second octet carries the code of the addressee inside the arriving ICM (processor or particular termination).

The distribution function DIS indicated for clarity reasons as concentrated in FIG. 2, is actually distributed on the output bus (indicated as 8 in FIG. 2 and here consisting of the whole of connection 475 and wires 476 and 477); in fact, as already seen, each termination examines the cells transiting on the bus and the addressee extracts from the bus its data activating the dialogue with the connection network. Even the control behaves analogously, with the difference that now it is necessary to record also the first octet of each arriving cell (indicative of sender ICM).

The initial reset and the criterium of the last octet leave the control circuit CF8 in the idle state. When in this state a data-ready signal arrives from the network through wire 476, receiver RC3 and wire 474, the relevant octet is loaded by CF8 on register RG24 through a pulse on wire 470, through connection 475, receivers REC1 and connection 472. An active level on wire 471 generates the passage of such a pulse, through emitter TR2, to wire 477 as a data-seized answer. The operation is repeated at the second octet, the first octet is transferred on RG23 through connection 468, while the second octet is loaded on register RG24. At this point connection 469 can carry the cell destination code to control circuit CF8. If the cell is not meant for the processor, no further loads are carried out, and no answer is given on wire 477, CF8 waits for the indication of the last octet on wire 473 to return to the initial state. If, however, the cell is meant for the processor, CF8 replies as for the first octet and besides, through pulse on wire 466 causes the loading of the contents of register RG23 in FI8, which is the usual FIFO memory which is to store the cell. Thus the whole cell is loaded up to the last octet signal on wire 473; then the last two octets present on RG24 and RG23 are still loaded in FI8.

The cell present in FI8 is signalled by CF8 on wire 442 to the already examined circuit LAD, which replies on wire 441; through wire 465 circuit CF8 gives loading signals of register RG22 and of unloading of memory FI8. The octets are thus transferred by FI8 to LAD through connection 463, RG22, connection 438. Wire 464 communicates the occurred transfer of the last cell octet to CF8.

If the cell presented by the connection network receives no answer by any TMA present and is not meant for the processor (event which can occur for code or routing error), the control circuit CF8 intervenes to avoid connection network output block. CF8 unloads the cell by using the same commands used to load the cells for the processor, with the only exception of loading pulses FI8.

It is clear that what described has been given only by way of a non-limiting example. Variations and modifications are possible without going out of the scope of the invention.

We claim:

1. A label-switching and control interface for fast packet switching, comprising:
   a plurality of bidirectional asynchronus multiplex lines forwarding information-signal cells representing respective packets and corresponding to different calls;
   respective programmed-logic units connected to each of said bidirectional asynchronous multiplex lines for fast cell processing;
   a multiplex switching network having an input bus connected to all of said programmed-logic units;
   an arbitrating circuit between said input bus and said multiplex switching network and having a first bus connected therewith, said arbitrating circuit controlling communication between said programmed-logic units selectively and said multiplex switching network;
   a distribution circuit connected to all of said programmed-logic units by a second bus and to an output bus of said multiplex switching network;
   a common control circuit connected to all of said programmed-logic units by a third bus and accessing said multiplex switching network through a first connection to said arbitration circuit; and means forming a second connection between said distribution circuit and said control circuit whereby said multiplex switching network accesses said common control circuit.

2. The label-switching and control interface as defined in claim 1 wherein each of said programmed logic units comprises an incoming section comprising:

circuits detecting cell locations in a data flow along said lines;

circuits separating datum cells from signalling, supervision, stuffing, auxiliary flow cells, carrying out label switching and adding self-routing code for the multiplex switching network;

circuits for controlling the forwarding of cell octets to the multiplex switching network and for the temporary storage of a service class;

circuits including a memory for storing cells for multipoint connections and for retransmission of the stored cells for a requested number of times;

a further arbitrating circuit among sources of cells to be sent to the switching network;

a processor;

a temporary memory for cells intended for the processor and an interface for access to the memory by the processor; and an auxiliary output interface for emission of cells of an auxiliary information flow.

3. The label-switching and control interface defined in claim 2 wherein said programmed logic units each comprise a microprogrammed logic having:

an arithmetic-logic unit with input and output registers connected to an internal bus through multiplexing and demultiplexing circuits;

registers for particular operands connected to an output bus of the memory;

a microprogrammed memory, a respective register and a sequencing circuit with a multiplexer for conditioned jumps and a multiplexer for bits under test; and a register for temporary storage of a label of a processed cell.

4. The label-switching and control interface defined in claim 2 wherein each of said programmed-logic units comprises a parallel interface for translating input cells into messages for the processor and processor messages into cells to transmit on a respective one of said lines, said parallel interface comprising:

a control circuit for signalling the processor;

a data register;

a state register;

a circuit for controlling an information flow coming from the processor;

a further data register connected with the processor; and an addressing circuit controlled by the processor.

5. The label-switching and control interface defined in claim 4 wherein each of said blocks comprises a transmission section having:

a temporary memory for the cells arriving from the further data registers;

a temporary memory for the cells arriving from the multiplex switching network to be forwarded on the respective line, preceded by a circuit which selects cells meant for the respective unit and calculates label redundancies;

a generator of stuffing cells and of supervision cells;

control circuits for transmission and arbitration; and transmission circuits including a register for receiving octets of cells of an auxiliary flow, a register for receiving octets of the cells arriving from the processor through said temporary memory, a register for receiving supervision and stuffing cells arriving from said generator and a register for receiving the data cells arriving from the multiplex switching network through said temporary memory, a multiplexer for receiving the outputs of respective registers and a shift register for the transmission of octets on the respective line.

6. The label-switching and control interface defined in claim 2 wherein said arbitrating circuit comprises:

logic circuits for receiving a request of forwarding the cells to the switching network by said programmed-logic units present and of the processor and the emission of corresponding enabling signals according to an arbitrating algorithm;

a temporary memory circuit forming an interface between said processor and said multiplex switching network;

a temporary memory circuit forming an interface between the switching network and the processor and for control of information flow from the network, and which unloads from the switching network cells not accepted by the programmed logic units or by the processor; and a converter for the conversion of the incoming and outgoing flows from parallel to series and from series to parallel.

* * * * *